United States Patent
Chronowski et al.

(10) Patent No.: US 9,299,198 B2
(45) Date of Patent: Mar. 29, 2016

(54) FLEET VEHICLE AFTERMARKET EQUIPMENT MONITORING

(71) Applicant: Ford Global Technologies, LLC, Dearborn, MI (US)

(72) Inventors: David Chronowski, Harrison Township, MI (US); Kevin Michael Bullister, Dexter, MI (US); Randy Michael Freiburger, Novi, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 14/455,084

(22) Filed: Aug. 8, 2014

(65) Prior Publication Data

US 2016/0042577 A1    Feb. 11, 2016

(51) Int. Cl.
     *G06F 19/00*      (2011.01)
     *G07C 5/00*      (2006.01)
     *G08G 1/00*      (2006.01)

(52) U.S. Cl.
     CPC ............... *G07C 5/008* (2013.01); *G08G 1/205* (2013.01)

(58) Field of Classification Search
     CPC ..... G06Q 30/02; G06Q 30/06; G06Q 20/102; G06Q 30/0204; G06Q 30/0283; B60R 1/00; B60R 2225/00
     USPC .......... 701/29.3; 340/309.7, 425.5, 439, 576; 705/26.1
See application file for complete search history.

(56) References Cited

U.S. PATENT DOCUMENTS

| | | | |
|---|---|---|---|
| 5,825,283 A * | 10/1998 | Camhi | 340/438 |
| 5,917,408 A * | 6/1999 | Cardillo et al. | 340/439 |
| 6,411,874 B2 | 6/2002 | Morgan et al. | |
| 7,339,483 B1 * | 3/2008 | Farmer | 340/576 |
| 8,483,651 B1 | 7/2013 | Zamora et al. | |
| 2007/0159354 A1 | 7/2007 | Rosenberg | |
| 2008/0140287 A1 | 6/2008 | Yang et al. | |
| 2009/0051510 A1 * | 2/2009 | Follmer et al. | 340/425.5 |
| 2009/0093236 A1 * | 4/2009 | Balan | H04W 4/02 455/411 |
| 2009/0109037 A1 * | 4/2009 | Farmer | 340/576 |
| 2012/0123951 A1 * | 5/2012 | Hyatt et al. | 705/305 |
| 2012/0194679 A1 * | 8/2012 | Nehowig | G06F 1/1626 348/148 |
| 2014/0074865 A1 * | 3/2014 | Zobrist et al. | 707/749 |
| 2014/0310075 A1 * | 10/2014 | Ricci | 705/13 |
| 2015/0057875 A1 * | 2/2015 | McGinnis et al. | 701/31.6 |

OTHER PUBLICATIONS

Williams., Benefits of IVHM an Analytical Approach, IEEE, 2006, p. 1-9.*

* cited by examiner

*Primary Examiner* — McDieunel Marc
(74) *Attorney, Agent, or Firm* — Jennifer M. Stec; Brooks Kushman P.C.

(57) ABSTRACT

A processor of a server may receive, from a plurality of vehicles, fleet alerts indicative of vehicle locations and status of aftermarket equipment installed to the vehicles, identify fleet alerts associated with vehicles of a fleet, and generate, based on the fleet alerts, fleet data providing the vehicle locations and status of the aftermarket equipment of the vehicles of the fleet. A processor of a vehicle may receive vehicle data including vehicle location and aftermarket data including a status of aftermarket equipment installed to the vehicle, determine a condition of an alert rule indicative of a status of aftermarket equipment installed to the vehicles is satisfied, and send an fleet alert to a remote service indicative of the status of the aftermarket equipment.

19 Claims, 4 Drawing Sheets

FLEET VEHICLE AFTERMARKET EQUIPMENT MONITORING

TECHNICAL FIELD

The illustrative embodiments generally relate to a method and apparatus for monitoring of aftermarket equipment of vehicles of a fleet.

BACKGROUND

Vehicle telematics units may be utilized to allow a user of a vehicle to interact with services available over a communications network. These services may include turn-by-turn directions, telephone communications, vehicle monitoring, and roadside assistance. In some cases, the telematics services may be provided by the vehicle or telematics unit manufacturer, while in other cases, the services may be provided by a third party telematics service provider.

SUMMARY

In a first illustrative embodiment, a system includes a processor configured to receive, from a plurality of vehicles, fleet alerts indicative of vehicle locations and status of aftermarket equipment installed to the plurality of vehicles, identify fleet alerts associated with vehicles of a fleet, and generate, based on the fleet alerts, fleet data providing the vehicle locations and status of the aftermarket equipment of the vehicles of the fleet.

In a second illustrative embodiment, a system includes a processor of a vehicle configured to receive information including vehicle data from a vehicle network and aftermarket data from installed vehicle aftermarket equipment, determine whether a condition of an alert rule indicative of a status of aftermarket equipment installed to the vehicles is satisfied according to the information, and when satisfied, send an fleet alert to a remote service indicative of a vehicle location and the status of the aftermarket equipment.

In a third illustrative embodiment, a system includes a server configured to receive fleet data for vehicles of a fleet including fleet vehicle locations and status of fleet vehicle aftermarket equipment, and display a user interface including a map, a plurality of vehicle indications overlaid on the map indicative of the locations of the vehicles, and a status indication visually referencing one of the vehicles indicative of a status of aftermarket equipment of the one of the vehicles

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Fleet vehicles, such as police cars or other public safety vehicles, may be built by vehicle manufacturers, and then modified post-production to fleet specifications. In many cases, these modifications are performed by fleet vehicle outfitters. The outfitters may install a variety of aftermarket equipment such as light bars, sirens, and computers, as well as control systems to run and monitor the installed equipment.

A vehicle-based computing system (VCS), such as a vehicle telematics unit, may be configured to accumulate vehicle data, in some cases treat the vehicle data via on-board calculations, and periodically offload the accumulated and processed data to a remote telematics service provider. The vehicle data that is offloaded may be further augmented with additional information, such as current vehicle conditions and location. While the telematics unit may be configured to offload vehicle data, the telematics unit may lack an ability to offload data from the additionally-installed fleet equipment. Thus, to inform a fleet manager of a status of the aftermarket equipment installed to the vehicle, the operator of the fleet vehicle may typically perform voice communication over a fleet radio system.

An improved vehicle telematics unit may be configured to utilize a fleet client service to provide an interface through which information from additionally-installed equipment may be offloaded from the vehicle. As an example, the fleet client service may be configured to receive aftermarket data information by way of a data reporting module connected to the aftermarket equipment, in addition to the vehicle data. This received data may be compared with alert rules to allow the fleet client service to determine, for example, whether sirens are engaged, whether the light bar is engaged, whether the vehicles is in pursuit mode, whether the driver's door is opened, whether the trunk is opened, whether the airbags have deployed, and whether weapons have been unlocked or removed from the vehicles. By receiving the aftermarket data from the aftermarket equipment, the fleet client service may be configured to determine the status of the aftermarket equipment installed to the vehicle, and offload fleet alert information indicative of whether sirens are engaged, light bars are engaged, or vehicles pursuits or high-speed chases are occurring, lessening the need for the operator to provide verbal status, location, and other updates while operating the fleet vehicle.

Figure 1:
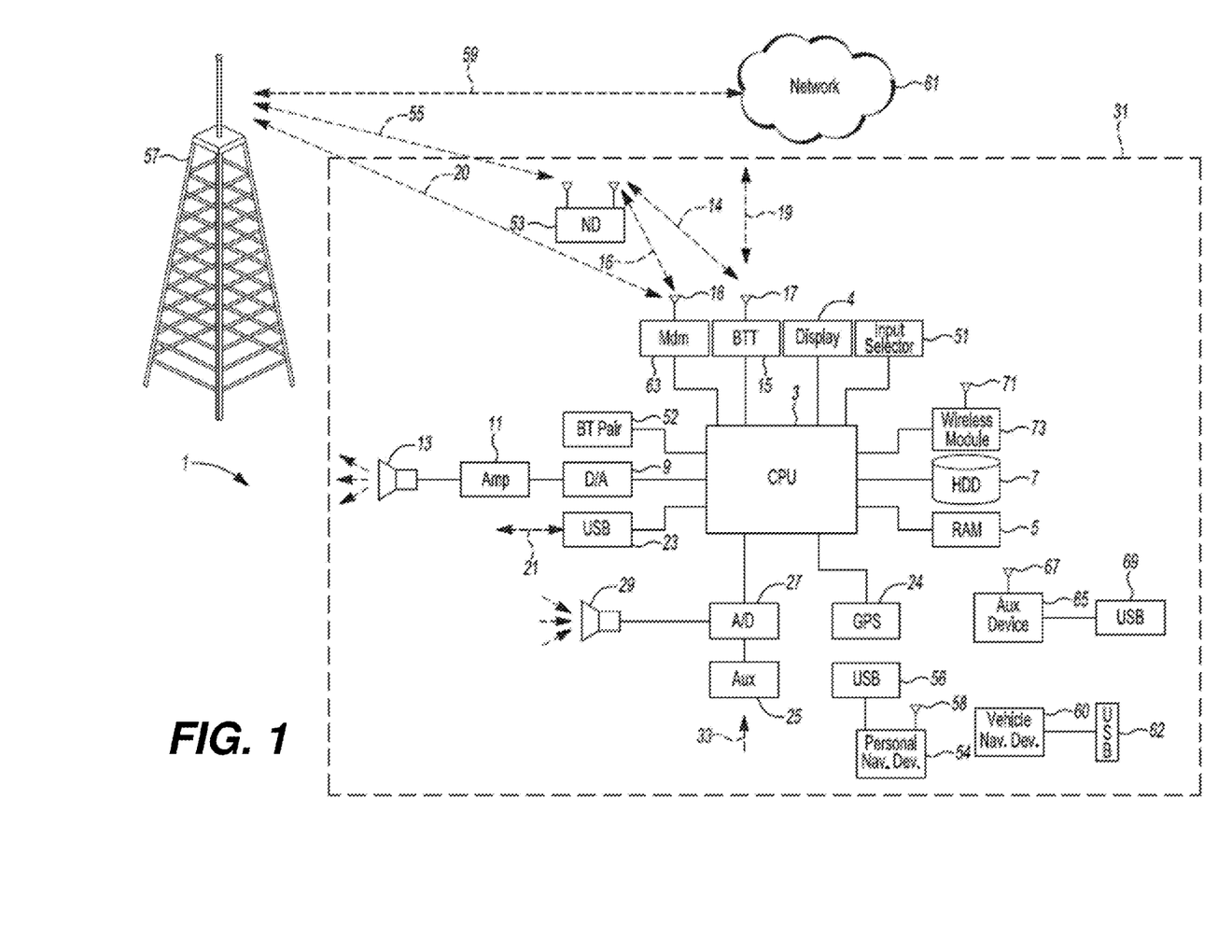
FIG. 1 illustrates an example block topology for a vehicle-based computing system for a vehicle.

FIG. 1 illustrates an example block topology for a vehicle-based computing system 1 (VCS) for a vehicle 31. An example of such a vehicle-based computing system 1 is the SYNC® system manufactured by FORD MOTOR COMPANY®. A vehicle enabled with a vehicle-based computing system may contain a visual front end interface 4 located in the vehicle 31. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 or central processing unit (CPU) 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. These include, but are not limited to, HDDs, compact disks (CDs), digital versatile disks (DVDs), magnetic tapes, solid state drives, portable universal serial bus (USB) drives and any other suitable form of persistent storage 7.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, a screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor 3. Although not shown, numerous of the vehicle components and auxiliary components in communication with the VCS 1 may use a vehicle network (such as, but not limited to, a car area network (CAN) bus) to pass data to and from the VCS 1 (or components thereof).

Outputs to the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a nomadic device (ND) 53 (e.g., cell phone, smart phone, PDA, or any other device having wireless remote network connectivity). The nomadic device 53 can then be used to communicate 59 with a network 61 outside the vehicle 31 through, for example, communication 55 with a cellular tower 57. In some embodiments, tower 57 may be a WiFi access point.

Exemplary communication between the nomadic device 53 and the BLUETOOTH transceiver is represented by communication 14.

Pairing a nomadic device 53 and the BLUETOOTH transceiver 15 can be instructed through a button 52 or similar input. Accordingly, the CPU is instructed that the onboard BLUETOOTH transceiver 15 will be paired with a BLUETOOTH transceiver in a nomadic device 53.

Data may be communicated between CPU 3 and network 61 utilizing, for example, a data-plan, data over voice, or dual-tone multiple frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication.

In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the Institute of Electrical and Electronics Engineers (IEEE) 802 personal area network (PAN) protocols. IEEE 802 local area network (LAN) protocols include wireless fidelity (WiFi) and have considerable cross-functionality with IEEE 802 PAN. Both are suitable for wireless communication within a vehicle 31. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle 31 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle 31. 3G standards are now being replaced by IMT-Advanced (4G) which offers 200 mbs for users in a vehicle 31 and 1 gbs for stationary users. If the user has a data-plan associated with the nomadic device 53, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless LAN device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the processor 3 of the vehicle 31. In the case of certain temporary data, for example, the data can be stored on the HDD or other storage media 7 until such time as the data is no longer needed.

Additional sources that may interface with the vehicle 31 include a PND 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices 65 can be connected through a wireless 67 or wired 69 connection.

Auxiliary device 65 may include, but are not limited to, personal media players, wireless health devices, portable computers, and the like.

Also, or alternatively, the CPU 3 could be connected to a vehicle-based wireless router 73, using for example a WiFi (IEEE 803.11) 71 transceiver. This could allow the CPU 3 to connect to remote networks within range of the local router 73.

In addition to having exemplary processes executed by a vehicle computing system located in a vehicle 31, in certain embodiments, the exemplary processes may be executed at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the VCS 1 located within the vehicle 31 itself is capable of performing the exemplary processes.

Figure 2:
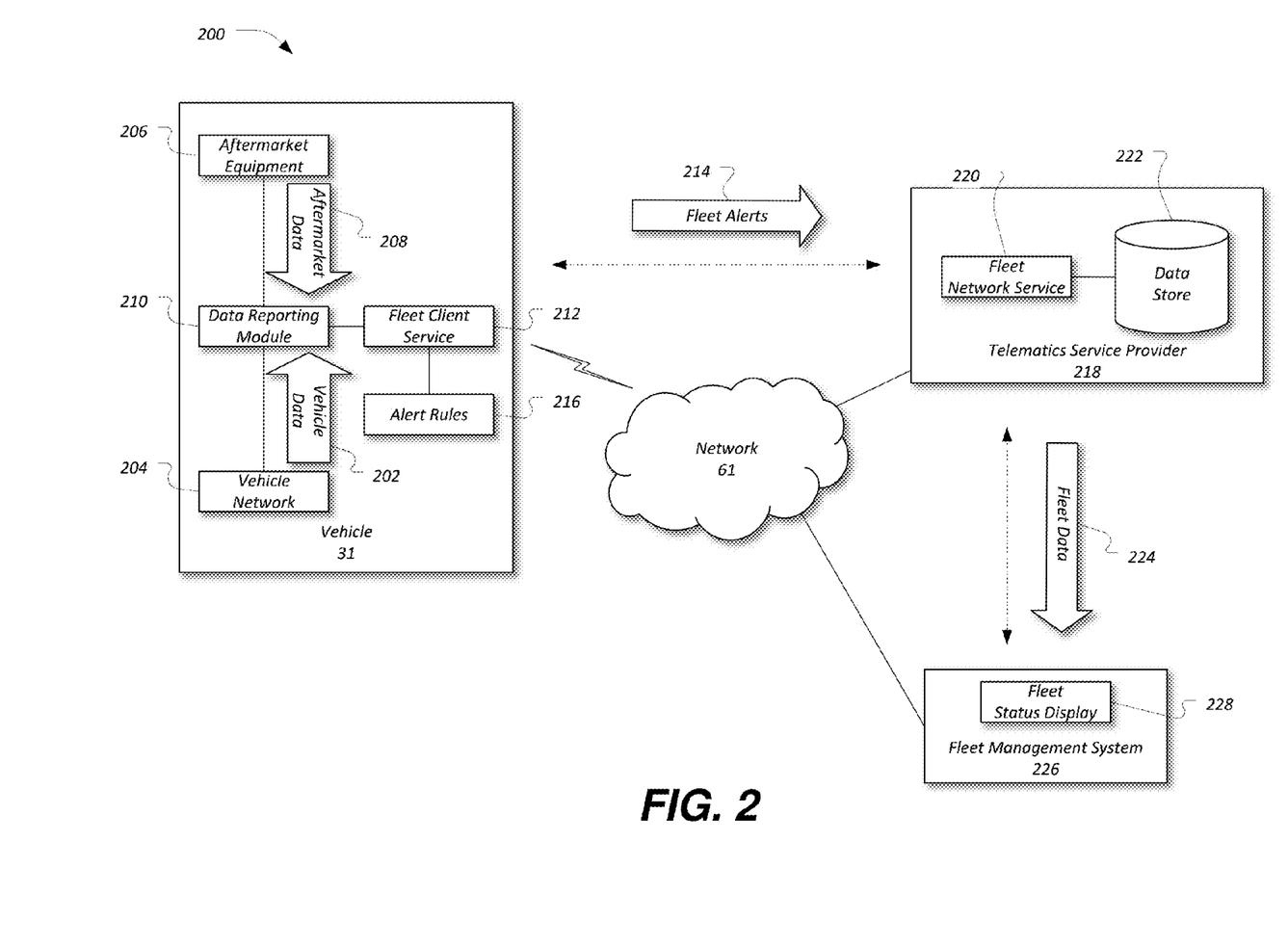
FIG. 2 illustrates an exemplary telematics system including a vehicle having aftermarket equipment installed.

FIG. 2 illustrates an exemplary telematics system 200 including a vehicle 31 having aftermarket equipment 206 installed. The system 200 may further include a remote telematics service provider 218 in communication via network 61 with the VCS 1 of the vehicle 31. The vehicle 31 may include a data reporting module 210 configured to collect vehicle data 202 from a vehicle network 204 and aftermarket data 208 from the aftermarket equipment 206. The vehicle 31 may further include a fleet client service 212 in communication with the data reporting module 210 and over the network 61 to the telematics service provider 218. The fleet client service 212 may be configured to generate fleet alerts 214 based on the data received from the data reporting module 210 and alert rules 216 of the vehicle 31. The telematics service provider 218 may include a fleet network service 220 configured to receive the fleet alerts 214 and other fleet information from the fleet client service 212, maintain the received data in a data store 222, and generate fleet data 224 based on the fleet alerts 214. The system 200 may further include a fleet management system 226 configured to receive the fleet data 224 from the telematics service provider 218 to provide to a fleet operator on a fleet status display 228.

The vehicle data 202 may include various elements of information available over a vehicle bus 204 or vehicle network 204 (e.g., the CAN bus) that may be useful for analysis. For example, the vehicle data 202 may include data collected from vehicle systems such as vehicle stability, traction control, power train, and driver assistance. Exemplary vehicle data 202 may accordingly include values retrieved from vehicle systems, such as vehicle velocity, steering wheel angle, heave displacement, heave velocity, yaw rates, lateral acceleration, pitch angle, pitch rate, vehicle slip angle, roll angle, roll rate, slip/spin wheel conditions, driver torque applied drive wheel torque, applied wheel brake pressure, and fuel remaining. The vehicle data 202 may also include other types of information regarding the vehicle 31, such as vehicle geographic location (e.g., from an on-board global positioning system), date and time information during which the vehicle data 202 may have been collected, and information identifying the sending vehicle 31 such as vehicle identification number (VIN), international mobile station equipment identity (IMEI) of the VCS 1, or another vehicle-specific identifier.

The aftermarket equipment 206 may include hardware such as light bars, sirens, radar/lidar equipment, beacons, loudspeakers, perimeter lighting, internal partitions, and push bumpers. The aftermarket equipment 206 may further include computers or other controllers configured to allow a vehicle 31 operator to control the aftermarket equipment 206. The aftermarket equipment 206 may also include one or more removable items, such as weapons, ammunition, flashlights or flares that may be locked, unlocked, or taken from the vehicle by the operator in use of the vehicle 31. In many cases, the aftermarket equipment 206 may be installed to the vehicle 31 post-production by a vehicle 31 outfitter, in accordance with requirements of a fleet manager.

The aftermarket data 208 may include various elements of information available from the aftermarket equipment 206 that may be useful for analysis. For example, the aftermarket data 208 may include status information indicative of whether the light bars, sirens, radar/lidar equipment, beacons, loudspeakers, and/or perimeter lighting are activated or deactivated. As another example, the aftermarket data 208 may indicate whether one or more removable items are locked, unlocked, or taken from the vehicle 31.

The reporting module 210 may be configured to interface with the vehicle bus 204 or network 204 to retrieve the vehicle data 202 from the vehicle 31. The reporting module 210 may be further configured to interface with the aftermarket equipment 206 to receive the aftermarket data 208 from the aftermarket equipment 206. To allow for the receipt of the aftermarket data 208, the reporting module 210 may expose a communication interface to which the aftermarket equipment 206 may connect. As one possibility, the reporting module 210 may include connections to the aftermarket equipment 206 to allow the reporting module 210 to be informed when certain features are activated. For instance, designated or configured input ports of the reporting module 210 may be associated with particular elements of aftermarket data 208 provided by the aftermarket equipment 206 (e.g., a port for a light bar to provide its status, a port for a siren to provide its status, etc.). As another possibility, the reporting module 210 may be configured to connect to a network or diagnostic interface of one or more elements of aftermarket equipment 206 to receive the aftermarket data 208. As yet a further possibility, the aftermarket equipment 206 may interface with the vehicle 31 network (e.g., the CAN network), and the reporting module 210 may collected the aftermarket data 208 via the vehicle 31 network.

The fleet client service 212 may be one application included on the storage 7 of the VCS 1. The fleet client service 212 may include instructions that, when loaded into the non-persistent storage 5 and executed by the processor 3, cause the VCS 1 to perform the operations of the fleet client service 212 discussed herein. More specifically, the fleet client service 212 may be configured to receive the data collected by the reporting module 210, such as the vehicle data 202 and aftermarket data 208, and generate fleet alerts 214. A fleet alert 214 may include information indicative of a particular issue or behavior being encountered by the vehicle 31, such as activation or deactivation of an element of aftermarket equipment 206, or entrance of the vehicle 31 into a pursuit mode.

The fleet client service 212 may be configured to utilize a set of alert rules 216 to facilitate the determination of the fleet alerts 214. Based on the received data collected by the reporting module 210, the workload estimator module 310 may be configured to match the received data against one or more conditions specified by the alert rules 216, where each alert rule 216 may be defined to indicate a particular fleet alert 214 encountered by the vehicle 31 when the conditions of the alert rules 216 are satisfied.

As one example, a pursuit alert rule 216 may include a condition wherein if lateral acceleration or brake torque data in the vehicle data 202 exceed predefined values, a timer may be started and pursuit mode alerts 214 may be issued including vehicle 31 information (e.g., vehicle data 202, aftermarket data 208, etc.) at a heightened frequency until the timer expires. Moreover, if the condition of the pursuit rule 216 continue to persist upon expiration of the timer, the timer may be extended for an additional time period. As another example, a siren-on alert rule 216 may include a condition wherein if the aftermarket data 208 indicates that the police siren is activated (e.g., according to data received by designated or configured input ports of the reporting module 210), a siren-on fleet alert 214 may be issued by the vehicle 31. Similarly, a siren-off alert rule 216 may include a condition wherein if the aftermarket data 208 indicates that the police siren is deactivated), a siren-off fleet alert 214 may be issued by the vehicle 31. As a further example, a light-bar-on alert rule 216 may include a condition wherein if the aftermarket data 208 indicates that the light bar is activated (e.g., according to data received by designated or configured input ports of the reporting module 210), a light-bar-on fleet alert 214 may be issued by the vehicle 31. Similarly, a light-bar-off alert rule 216 may include a condition wherein if the aftermarket data 208 indicates that the light-bar is deactivated), a light-bar-off fleet alert 214 may be issued by the vehicle 31. As yet another example, an event-data-recorder alert rule 216 may include a condition wherein if fleet-configurable conditions are experienced (e.g., an operator selects to activate recording), a timer may be started and event-data-recorder alerts 214 may be issued including vehicle 31 information (e.g., vehicle data 202, aftermarket data 208, etc.) at a heightened frequency until the timer expires. Moreover, if the condition of the event-data-recorder rule 216 continue to persist upon expiration of the timer, the timer may be extended for an additional time period. As another example, a default fleet alert 214 may include a condition wherein a timeout has expired, allowing the fleet client service 212 to offload periodic fleet alerts 214 regarding the general status of the vehicle 31.

The fleet alerts 214 may include information including an identifier of the type of alert rule 216 triggered to cause the generation of the fleet alert 214 (e.g., siren-on, pursuit mode, etc.). The fleet alerts 214 may further include information common to fleet alerts 214 (e.g., VIN, vehicle location), as well as additional information that may vary according to the type of fleet alert 214 (e.g., what specific status information is retrieved via the vehicle network 204, etc.).

The telematics service provider 218 may include network hardware configured to allow the telematics service provider 218 to communicate with the vehicles 31 over the network 61. The telematics service provider 218 may further include one or more computing devices, such as computers, microprocessor-based appliances, a peer networked devices or network nodes. The telematics service provider 218 may be configured to execute programs on one or more processors of the computing devices, where the programs are stored on one or more memory devices of the telematics service provider 218. As one example, the telematics service provider 218 may be configured to execute a fleet network service 220 configured to receive the fleet alerts 214 from the fleet client services 212 of the vehicles 31 via the network 61, maintain the fleet alerts 214 in the data store 222, and compile fleet data 224 from the data of the data store 222. While the network 61 is illustrated as being a single network 61, in some examples the network 61 may be implemented as multiple separate networks 61, such as a private network 61 housing the telematics service provider 218 connected to a public network such as the Internet for data transport between the telematics service provider 218 and the vehicles 31.

The data store 222 may include one or more storage devices configured to maintain information for the telematics service provider 218. For example, the data store 222 may maintain the fleet alerts 214 received from the vehicles 31 via the fleet network service 220. The data store 222 may store additional information as well, such as which vehicles 31 are associated with which fleets (e.g., mapping vehicle identifiers such as VIN to fleet identifiers), as well as other vehicle data 202 and aftermarket data 208 that may be provided by the vehicles 31. The data store 222 may be configured to be queried by the fleet network service 220 according to vehicle identifier or fleet identifier, and may provide the stored fleet alerts 214 that match to the specified vehicle 31 or to the fleet generally, responsive to the query.

The fleet data 224 may include information from the data store 222 complied into a form providing status information regarding vehicles 31 associated with a fleet. The fleet data 224 may include, for example, information regarding the speed, locations, and aftermarket equipment 206 status of the vehicles 31 of the fleet (e.g., determined according to the fleet alerts 214) as well as information regarding the aftermarket status of the vehicles 31 (e.g., which vehicles 31 have lights or sirens activated, which vehicles 31 have removable items such as weapons or flares removed, etc. as determined according to the aftermarket data 208).

The fleet network service 220 may be configured to compile the fleet data 224 based on the fleet alerts 214 maintained by the telematics service provider 218 in the data store 222. As an example, the telematics service provider 218 may be configured to generate fleet data 224 updates for the fleet of vehicles 31 periodically. As additional examples, the telematics service provider 218 may be configured to generate fleet data 224 updates when receiving fleet alerts 214 from the vehicle 31, or responsive to requests for updated fleet data from the fleet management system 226.

The fleet management system 226 may be configured to receive the fleet data 224 from the telematics service provider 218, and use the fleet data 224 to provide visibility into the status of the vehicles 31 of the fleet to a fleet operator. As an example, the fleet management server 226 may be configured to provide a fleet status display 228 to a fleet operator indicative of the current locations and status of the vehicles 31 of the fleet. The fleet status display 228 may include various hardware displays configured to provide visual information regarding the locations and statuses of the vehicles 31 of the fleet. As another example, the fleet management system 226 may be configured to provide the fleet operator with updates indicative of a change in status of a vehicle 31 (e.g., an automatically provided message indicating that a vehicle 31 has begun a pursuit, automatically provided update messages indicative of the locations of vehicles 31 in pursuit, etc.) without requiring an operator of the vehicle 31 to manually radio in the changes in status.

Variations on the system 200 are possible. As one possibility, the fleet network service 220 may be configured to receive the vehicle data 202 and aftermarket data 208 from the vehicles 31, and process the received data to generate the fleet alerts 214 remotely. As another possibility, for fleets having sufficient computing resources, the vehicles 31 may be configured with fleet-specific settings configured to cause the vehicles 31 to send the fleet alerts 214 (or the vehicle data 202 and aftermarket data 208) to the fleet management system 226, rather than to the telematics service provider 218. As yet a further possibility, the fleet management system 226 may be configured to provide commands to the fleet client service 212 to enable or disable reporting functionality, or to change the reporting settings of the reporting module 210 or fleet client service 212 (e.g., which elements of aftermarket data 208 provided by the aftermarket equipment 206 are to be reported to the telematics service provider 218 or fleet management system 226).

Figure 3:
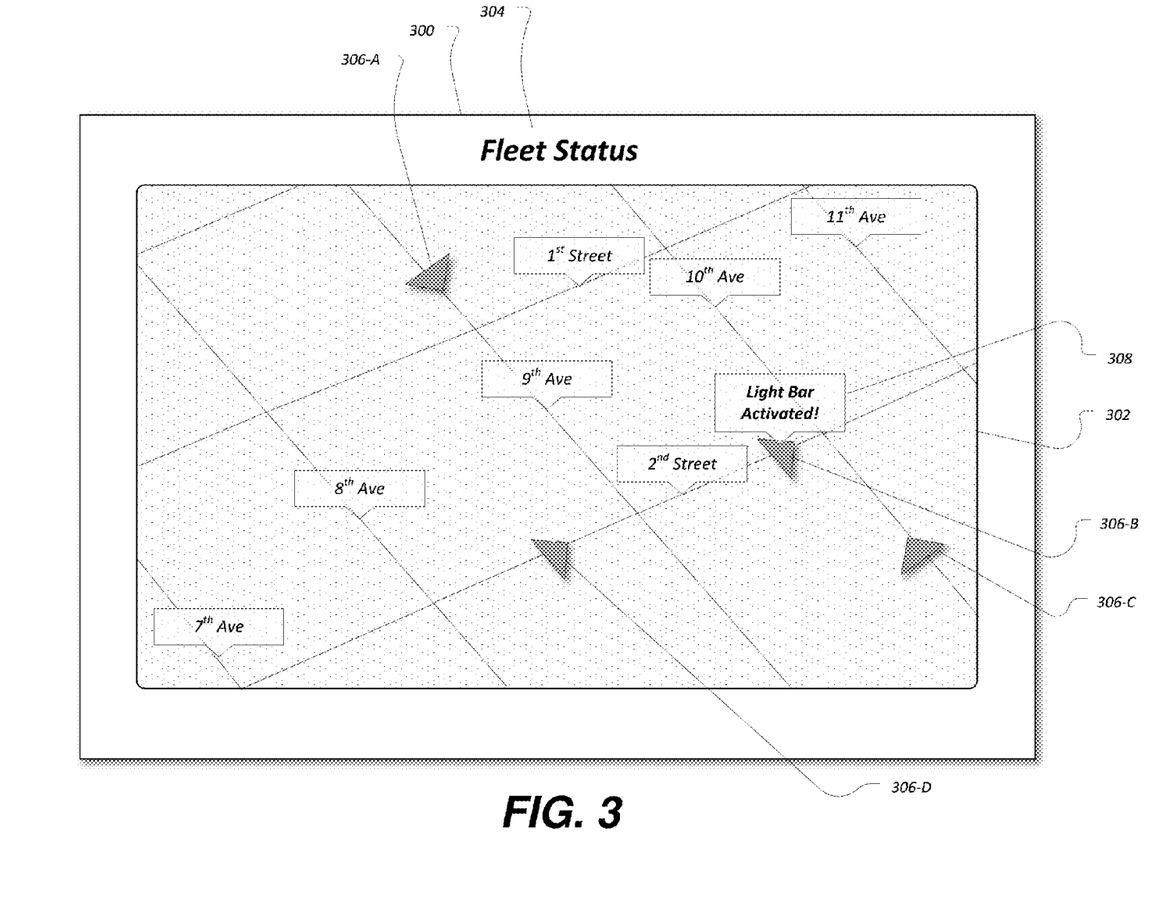
FIG. 3 illustrates an exemplary user interface configured to use fleet data to display vehicle fleet status.

FIG. 3 illustrates an exemplary user interface 300 configured to use fleet data 224 to display vehicle 31 fleet status. The user interface 300 may be provided, for example, via the fleet status display 228 of the fleet management system 226 to provide visibility into the current status of the vehicle 31 fleet. As illustrated, the user interface 300 includes a map 302 and a label 304 indicating that the map 302 illustrates current fleet vehicle indications 306-A through 306-D (collectively 306) at current geographic locations of the corresponding vehicles 31. The map 302 further includes various details regarding the surroundings of the vehicles 31, such as street placement and street names.

The user interface 300 may further include status indications 308 for the vehicle 31 indicative of the status of the aftermarket equipment 206 of the corresponding vehicle indication 306, as determined according to the fleet data 224. As illustrated, the status indication 308 indicates that the light bar for the vehicle 31 indicated by the vehicle indication 306-B has been activated. As some other possibilities, the user interface 300 may include status indications 308 indicating other status updates of the vehicles 31, such as that a weapon was removed from the vehicle 31, that a vehicle has entered or exited pursuit mode, that vehicle airbags have deployed, etc. Thus, by way of the user interface 300, an operator of the fleet management system 226 may be made aware of the real-time status of the vehicles 31, without requiring the operator of the fleet vehicle 31 to perform voice communication over a fleet radio system.

Figure 4:
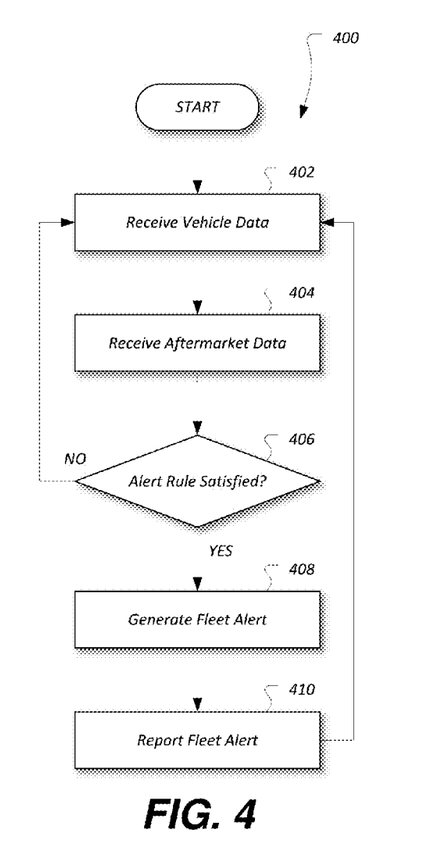
FIG. 4 illustrates an exemplary process for providing vehicle data and aftermarket data from a vehicle.

FIG. 4 illustrates an exemplary process 400 for providing fleet alerts 214 from a vehicle 31. The process 400 may be performed, for example, by the fleet client service 212 in communication with the data reporting module 210.

At operation 402, the fleet client service 212 receives the vehicle data 202. For example, the reporting module 210 may be configured to interface with the vehicle bus 204 or network 204 to retrieve the vehicle data 202 from the vehicle 31, and the fleet client service 212 may be configured to receive the vehicle data 202 captured by the reporting module 210.

At operation 404, the fleet client service 212 receives the aftermarket data 208. The reporting module 210 may be configured to interface with the aftermarket equipment 206 to receive the aftermarket data 208 from the aftermarket equipment 206. To allow for the receipt of the aftermarket data 208, the reporting module 210 may expose a communication interface to which the aftermarket equipment 206 may connect. As one possibility, the reporting module 210 may include hardwired connections to the aftermarket equipment 206, such as connectors that may be placed in series with switchable elements of aftermarket equipment 206 to allow the reporting module 210 to be informed when certain features are activated. As another possibility, designated or configured input ports of the reporting module 210 may be associated with particular elements of aftermarket data 208 provided by the aftermarket equipment 206 (e.g., a port for a light bar to provide its status, a port for a siren to provide its status, etc.). As another possibility, the reporting module 210 may be configured to connect to a network or diagnostic interface of one or more elements of aftermarket equipment 206 to receive the aftermarket data 208. As yet a further possibility, the aftermarket equipment 206 may interface with the vehicle 31 network (e.g., the CAN network), and the reporting module 210 may collected the aftermarket data 208 via the vehicle 31 network.

At operation 406, the fleet client service 212 determines whether any conditions of the alert rules 216 are satisfied by the received vehicle data 202 and aftermarket data 208. As one example, a pursuit alert rule 216 may include a condition wherein if lateral acceleration or brake torque data in the vehicle data 202 exceed predefined values, a timer may be started and heightened-reporting-rate pursuit mode alerts 214 may be issued. As another example, a siren-on alert rule 216 may include a condition wherein if the aftermarket data 208 indicates that the police siren is activated a siren-on alert may be issued by the vehicle 31. As a further example, a light-bar-on alert rule 216 may include a condition wherein if the aftermarket data 208 indicates that the light bar is activated, a light-bar-on alert may be issued by the vehicle 31. As yet another example, an event-data-recorder alert rule 216 may include a condition wherein if fleet-configurable conditions are experienced event-data-recorder alerts 214 may be issued including vehicle 31 information at a heightened frequency until the timer expires. As another example, a default alert rule 216 may include a condition wherein a fleet alert 214 update is generated upon a periodic timeout. Other rules 216 are possible as well, such as rules including conditions that indicate the vehicle 31 trunk is opened, vehicle 31 airbags are deployed, vehicle 31 weapons have been unlocked, vehicle 31 weapons have been removed, etc. If an alert rule 216 is satisfied, control passes to operation 408. Otherwise, control passes to operation 402.

At operation 408, the fleet client service 212 generates the fleet alert 214. For example, the fleet client service 212 may be configured to include, in the fleet alert 214, such as including an identifier of the type of alert rule 216 triggered to cause the generation of the fleet alert 214 (e.g., siren-on, pursuit mode, etc.), base information (e.g., VIN, vehicle location) common to all alerts 214, as well as additional information that may vary according to the type of fleet alert 214 (e.g., vehicle location, status information retrieved via the vehicle network 204, etc.).

At operation 410, the fleet client service 212 reports the fleet alert 214. For example, the fleet client service 212 may send the fleet alert 214 to an address of the telematics service provider 218 maintained by the vehicle 31. As another possibility, the fleet client service 212 may be configured with fleet-specific settings configured to cause the fleet client service 212 to send the fleet alert 214 to the fleet management system 226, rather than to the telematics service provider 218. After operation 410, control passes to operation 402.

Figure 5:
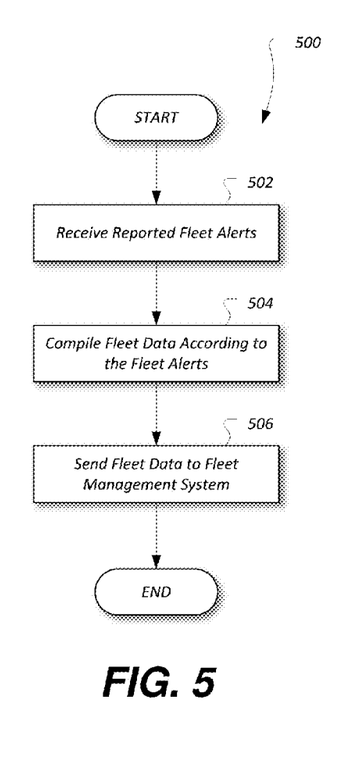
FIG. 5 illustrates an exemplary process for creating fleet data from vehicle data and aftermarket data.

FIG. 5 illustrates an exemplary process 500 for creating fleet data 224 from vehicle data 202 and aftermarket data 208. The process 500 may be performed, for example, by the fleet network service 220 of the telematics service provider 218 in communication with the fleet service clients 212 of the vehicles 31.

At operation 502, the fleet network service 220 receives reported fleet alerts 214 from the vehicles 31. For example, the fleet network service 220 may be configured to receive fleet alerts 214 sent from fleet client services 212 of vehicles 31 executing the process 400 discussed above. The fleet network service 220 may be further configured to store the received fleet alerts 214 in the data store 222.

At operation 504, the fleet network service 220 compiles fleet data 224 according to the fleet alerts 214. For example, the fleet network service 220 may be configured to query the data store 222 according to vehicle identifier or fleet identifier, receive fleet alerts 214 that match to the specified vehicle 31 or to vehicle 31 fleet responsive to the query, and compile the received fleet alerts 214 into fleet data 224 indicative of the status of the vehicles 31 of the fleet. In some cases, the fleet network service 220 may be configured to compile the fleet data 224 periodically. In other cases, the fleet network service 220 may be configured to compile the fleet data 224 responsive to a request for the fleet data 224 from the fleet management system 226. In yet further cases, the fleet network service 220 may be configured to compile the fleet data 224 responsive to receipt of fleet alerts 214, and may, for example, forward the received fleet alerts 214 to the fleet management system 226 associated with the vehicle 31 providing the fleet alert 214 (e.g., as determined according to the mapping vehicle identifiers to fleet identifiers stored in the data store 222 and the vehicle identifier included in the fleet alert 214).

At operation 506, the fleet network service 220 sends the fleet data 224 to the fleet management system 226. For example, the fleet network service 220 may send the fleet data 224 to an address of the fleet management system 226 maintained by the data store 222 as the fleet management system 226 for the compiled fleet data 224. After operation 506, the process 500 ends.

Figure 6:
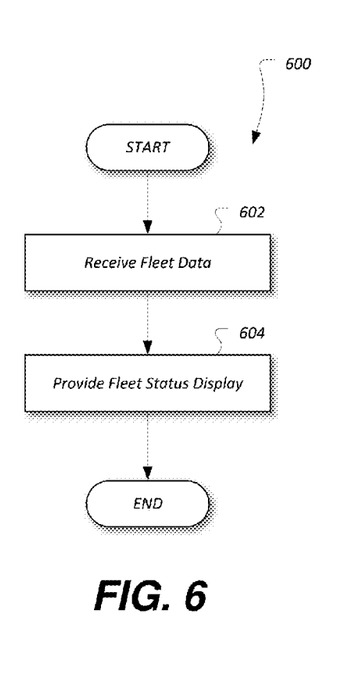
FIG. 6 illustrates an exemplary process for displaying a user interface including fleet data.

FIG. 6 illustrates an exemplary process 600 for displaying a user interface 300 including fleet data 224. The process 600 may be performed, for example, by the fleet management system 226 in communication with the fleet network service 220 of the telematics service provider 218.

At operation 602, the fleet management system 226 receives the fleet data 224. For example, the fleet management system 226 may be configured to receive fleet data 224 sent from fleet network service 220 executing the process 500 discussed above.

At operation 604, the fleet management system 226 provides the fleet data 224 to a fleet status display 228. For example, the fleet status display 228 may be configured to display the user interface 300 to provide visibility into the current status of the vehicle 31 fleet. After operation 604, the process 600 ends.

Variations on the process 400, 500 and 600 are possible. As an example, for instances where the fleet client service 212 sends the fleet alert 214 to the fleet management system 226, rather than to the telematics service provider 218, the fleet management system 226 may be configured to compile and display the fleet data 224, without the telematics service provider 218.

As another possibility, the fleet management system 226 may further include functionality to provide commands to adjust the current state of the aftermarket equipment 206 (e.g., via a command interface of the fleet status display 228 configured to allow the user to select a vehicle 31 or fleet and make an update to the current state of the vehicle 31 aftermarket equipment 206). For example, the aftermarket equipment 206 may be connected to the data reporting module 210 in a manner in which messages may be sent from the data reporting module 210 to the aftermarket equipment 206, such as via a network, diagnostic interface, or bi-directional data port. The fleet client service 212 may be further configured to receive commands from the fleet management system 226, e.g., via the telematics service provider 218 or directly, where the commands may forwarded to the data reporting module 210 and then to the aftermarket equipment 206 to be controlled. The commands may be addressed to the vehicles 31 according to identifiers such as VIN or fleet identifier, as some possibilities. Thus, by providing a flow of messages from the fleet management system 226 to the vehicle 31, a fleet operator may be able to provide an additional level of control on the vehicles 31 of the vehicle 31 fleet.

In sum, by receiving information from the aftermarket equipment 206, such as whether sirens are engaged, whether the light bar is engaged, whether the vehicles is in pursuit mode, and whether weapons have been unlocked or removed, a fleet management system 226 may be able to automatically provide visibility into the current status of the vehicle 31 fleet, lessening the need for the operator to provide verbal status, location, and other updates while operating the fleet vehicle 31.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a server programmed to
receive, from a plurality of vehicles, fleet alerts identifying vehicle locations and status of aftermarket equipment installed to the plurality of vehicles, and
generate, based on the fleet alerts, fleet data providing the vehicle locations and corresponding status of the aftermarket equipment of the vehicles of the fleet; and
a management system, programmed to display the vehicle locations and the corresponding status overlaid on a map.

2. The system of claim 1, wherein the aftermarket equipment includes at least one of a vehicle siren, a vehicle light bar, and a weapon holder configured to maintain a weapon stored in the vehicle.

3. The system of claim 1, wherein the status of the aftermarket equipment includes whether a vehicle siren is engaged, whether a vehicle light bar is engaged, whether a weapon stored in a weapon holder of the vehicle has been unlocked, and whether the weapon stored in the weapon holder of the vehicle has been removed.

4. The system of claim 1, wherein the server is further configured to:
maintain a mapping of vehicle identifiers to fleet identifiers,
receive vehicle identifiers in the fleet alerts, and
utilize the vehicle identifiers and the mapping to identify the fleet alerts associated with the vehicles of the fleet.

5. The system of claim 1, wherein the server is further configured to periodically generate the fleet data for the vehicles of the fleet.

6. The system of claim 1, wherein the server is further configured to generate the fleet data for the vehicles of the fleet responsive to receipt of aftermarket data from a vehicle indicative of a change in the status of the aftermarket equipment.

7. A system comprising:
a memory of a vehicle storing a fleet client service; and
a processor of the vehicle programmed to execute the fleet client service to receive information including vehicle data from a vehicle network and aftermarket data from installed vehicle aftermarket equipment, determine whether a condition of an alert rule indicative of a status of aftermarket equipment installed to the vehicles is satisfied according to the information, and when satisfied, send a fleet alert to a remote service indicative of a vehicle location and the status of the aftermarket equipment.

8. The system of claim 7, wherein the vehicle aftermarket equipment includes at least one of a vehicle siren, a vehicle light bar, and a weapon holder configured to maintain a weapon stored in the vehicle.

9. The system of claim 7, wherein the processor of the vehicle is further programmed to provide at least a portion of the vehicle data and the aftermarket data to the remote service according to a periodically-triggered alert rule.

10. The system of claim 7, wherein the processor of the vehicle is further programmed to provide the vehicle data and the aftermarket data to the remote service responsive to a change in the status of the aftermarket equipment.

11. The system of claim 7, wherein the remote service is one of a telematics service provider and a fleet management system.

12. The system of claim 7, wherein the fleet alert includes at least one of a vehicle identifier number (VIN) of the vehicle and a fleet identifier of the vehicle.

13. The system of claim 7, wherein the condition of the alert rule specifies a predefined value for at least one of lateral acceleration and brake torque data that, when satisfied, is indicative of a pursuit being performed by the vehicle.

14. The system of claim 7, wherein the condition of the alert rule specifies a predefined value for an element of aftermarket data, that when satisfied, is indicative of activation of an element of the aftermarket equipment.

15. The system of claim 7, wherein the condition of the alert rule specifies a predefined value for an element of aftermarket data, when satisfied, is indicative of deactivation of an element of the aftermarket equipment.

16. A system comprising:
a fleet status display; and
a server programmed to
receive fleet data for vehicles of a fleet including fleet vehicle locations and status of fleet vehicle aftermarket equipment, and
send to the fleet status display a user interface including a map, a plurality of vehicle indications overlaid on the map indicative of the locations of the vehicles, and a status indication visually referencing one of the vehicles indicative of a status of aftermarket equipment of the one of the vehicles.

17. The system of claim 16, wherein the aftermarket equipment includes at least one of a vehicle siren, a vehicle light bar, and a weapon holder configured to maintain a weapon stored in the vehicle.

18. The system of claim 16, wherein the status of the aftermarket equipment includes at least two of whether a vehicle siren is engaged, whether a vehicle light bar is engaged, whether a weapon stored in a weapon holder of the vehicle has been unlocked, and whether the weapon stored in the weapon holder of the vehicle has been removed.

19. The system of claim 16, wherein the user interface further includes a second status indication visually referencing a second one of the vehicles and indicative of a status of aftermarket equipment of the second one of the vehicles.

* * * * *